(12) United States Patent
Fujimoto

(10) Patent No.: US 7,304,524 B2
(45) Date of Patent: Dec. 4, 2007

(54) DATA INTERFACE CIRCUIT AND DATA TRANSMITTING METHOD

(75) Inventor: Tetsurou Fujimoto, Kanagawa (JP)

(73) Assignee: NEC Electronics Corporation (JP)

( * ) Notice: Subject to any disclaimer, the term of this patent is extended or adjusted under 35 U.S.C. 154(b) by 669 days.

(21) Appl. No.: 10/345,579

(22) Filed: Jan. 16, 2003

(65) Prior Publication Data

US 2003/0133513 A1 Jul. 17, 2003

(30) Foreign Application Priority Data

Jan. 17, 2002 (JP) ............................. 2002-009281

(51) Int. Cl.
*H03L 5/00* (2006.01)

(52) U.S. Cl. .......................... 327/333; 326/62; 326/80

(58) Field of Classification Search ................ 327/333; 326/30, 34, 62, 63, 64, 68, 80, 81
See application file for complete search history.

(56) References Cited

U.S. PATENT DOCUMENTS

| | | | | |
|---|---|---|---|---|
| 5,111,080 A | * | 5/1992 | Mizukami et al. | ............ 326/30 |
| 5,717,345 A | * | 2/1998 | Yokomizo et al. | ............ 326/80 |
| 6,417,675 B1 | * | 7/2002 | Johnson | ....................... 324/601 |
| 6,597,229 B1 | * | 7/2003 | Koyata et al. | ............... 327/333 |

FOREIGN PATENT DOCUMENTS

| | | |
|---|---|---|
| JP | 50-82954 | 7/1975 |
| JP | 02-046043 | 2/1990 |
| JP | 07-245575 | 9/1995 |
| JP | 07307661 A * | 11/1995 |
| JP | 08162942 A * | 6/1996 |
| JP | 2001-53598 | 2/2001 |
| JP | 2002-354053 | 12/2002 |
| JP | 2003-110630 | 4/2003 |

* cited by examiner

*Primary Examiner*—Linh My Nguyen
*Assistant Examiner*—William Hernandez
(74) *Attorney, Agent, or Firm*—Hayes Soloway, P.C.

(57) ABSTRACT p-channel MOS transistors are turned on alternatively when a positive phase signal and an opposite phase signal each generated from a first voltage signal. Moreover, n-channel MOS transistors are turned on alternatively when a positive phase signal and an opposite phase signal each generated from a second voltage signal. When being turned on, the p-channel MOS transistors supply current to transmission lines, respectively. When being turned on, the n-channel MOS transistors discharge current supplied from the transmission lines to a ground. A current to voltage conversion circuit converts current passing through the transmission lines into a voltage signal. Another current to voltage conversion circuit converts current passing through another transmission lines into a voltage signal.

28 Claims, 7 Drawing Sheets

DATA INTERFACE CIRCUIT AND DATA TRANSMITTING METHOD

BACKGROUND OF THE INVENTION

1. Field of the Invention

The present invention relates to a data interface circuit and data transmitting method.

2. Description of the Related Art

High speed transmission of signals between circuits of electronic equipment is required with high speed processing of a CPU (Central Processing Unit) built in the electronic equipment. However, when the transmission of signals is increased, EMI (Electronic Magnetic Interface), which causes an erroneous operation of electronic equipment between transmission lines, is generated. As a transmission method for preventing occurrence of this EMI, there is a differential transmission method. This differential transmission method is a transmission method in which a voltage to current conversion circuit converts a single voltage signal into a positive-phase current signal and an opposite-phase current signal to transmit each of the converted positive current signal and opposite current signal through a different transmission line.

Unexamined Japanese Patent Application KOKAI Publication No. 2001-53598 discloses a data interface circuit that transmits data by this differential transmission method. The content of this document is included in this specification.

This interface circuit includes a transmission section and a reception section. The transmission section has a first MOS transistor and a second MOS transistor that are turned on alternatively according to a binary input voltage signal. The reception section has a third MOS transistor and a fourth MOS transistor. The third MOS transistor is connected to the first MOS transistor through a first transmission line and supplies a current signal to the first transmission line when the first MOS transistor is turned on. The fourth MOS transistor is connected to the second MOS transistor through a second transmission line and supplies a current signal to the second transmission line when the second MOS transistor is turned on. The reception section outputs a signal, which is obtained by reversing a drain voltage of the fourth MOS transistor, as a binary output signal.

The first and second MOS transistors of the data interface circuit form a differential pair transistor. When the binary input voltage signal reaches a low (L), the first MOS transistor is turned on. When the binary input voltage signal reaches a high (H) level, the second MOS transistor is turned on. This data interface circuit suppresses occurrence of EMI by passing low-voltage current signals through the first and second transmission lines.

Provision of a plurality of such data interface circuits makes it possible to transmit a plurality of signals.

FIG. 11 is a configuration example of a data interface circuit that transmits a plurality of signals. As shown in FIG. 11, this data interface circuit includes a transmission section 100 having n-channel MOS transistors 11A, 11B, 11C, and 11D and a reception section 200 having current to voltage conversion circuits 12 and 15. Each of the n-channel MOS transistors 11A and 11B is connected to the current to voltage conversion circuit 12 through each of transmission lines 13A and 13B. Moreover, each of the n-channel MOS transistors 11C and 11D is connected to the current to voltage conversion circuit 15 through each of transmission lines 13C and 13D.

The n-channel MOS transistors 11A and 11B form a differential pair transistor. When voltage signals, which include a positive phase signal Din1 and an opposite phase signal D'in1 each generated from a single signal, are input, the n-channel MOS transistors 11A and 11B are turned on alternatively. When the positive phase signal Din1 reaches a high level, the n-channel MOS transistor 11A is turned on to discharge current supplied from the current to voltage conversion circuit 12 to a ground through the transmission line 13A. While, when the opposite phase signal D'in1 reaches a high level, the n-channel MOS transistor 11B is turned on to discharge current supplied from the current to voltage conversion circuit 12 to a ground through the transmission line 13B. The current to voltage conversion circuit 12 converts current, which flows into the transmission lines 13A and 13B alternatively, into voltage and outputs the converted voltage as a binary output signal.

Moreover, n-channel MOS transistors 11C and 11D form a differential pair transistor. When voltage signals, which include a positive phase signal Din2 and an opposite phase signal D'in2 each generated from a single signal, are input, the n-channel MOS transistors 11C and 11D are turned on alternatively. When the positive phase signal Din2 reaches a high level, the n-channel MOS transistor 11C is turned on to discharge current supplied from the current to voltage conversion circuit 15 to a ground through the transmission line 13C. While, when the opposite phase signal D'in2 reaches a high level, the n-channel MOS transistor 11D is turned on to discharge current supplied from the current to voltage conversion circuit 15 to a ground through the transmission line 13D. The current to voltage conversion circuit 15 converts current, which flows into the transmission lines 13C and 13D alternatively, into a voltage and outputs a change in the converted voltage as an output signal.

In this way, the data interface circuit shown in FIG. 11 can transmit two data signals by the differential transmission method.

However, the aforementioned signal processing circuit, data transmission circuit, etc transmit a plurality of signals in synchronization with the same clock. For this reason, currents that flow into the plurality of transmission lines are synchronized with each other. Accordingly, in the configuration that flows current into each transmission line in the same direction as in the data interface circuit shown in FIG. 11, EMI is intensified due to the plurality of synchronized currents, so that occurrence of EMI cannot be suppressed.

SUMMARY OF THE INVENTION

The present invention has been made with consideration given to the aforementioned circumstances, and an object of the present invention is to provide a data interface circuit and data transmitting method that are capable of suppressing occurrence of EMI even when a plurality of signals is transmitted.

In order to attain the above object, a data interface circuit of the present invention according to a first aspect of the present invention includes a transmission section having a first pair voltage to current conversion element formed of a first voltage to current conversion element and a second voltage to current conversion element, and a second pair current to voltage conversion element formed of a third voltage to current conversion element and a fourth voltage to current conversion element; a first transmission line connected to the first voltage to current conversion element; a second transmission line connected to the second voltage to current conversion element; a third transmission line connected to the third voltage to current conversion element; a fourth transmission line connected to the fourth voltage to current conversion element; and a reception section having a first current to voltage conversion circuit connected to the first and second transmission lines, and a second current to voltage conversion circuit connected to the third and fourth transmission lines, wherein the first voltage to current conversion element passes current through the first transmission line toward the first current to voltage conversion circuit when a first input voltage signal as a binary signal reaches a first voltage level, the second voltage to current conversion element passes current through the second transmission line toward the first current to voltage conversion circuit when the first input voltage signal reaches a second voltage level, the third voltage to current conversion element passes current through the third transmission line toward the transmission section from the second current to voltage conversion circuit when a second input voltage signal as a binary signal reaches a third voltage level, and the fourth voltage to current conversion element passes current through the fourth transmission line toward the transmission section from the second current to voltage conversion circuit when the second input voltage signal reaches a fourth voltage level, the first current to voltage conversion circuit converts current passing through the first and second transmission lines into a first output voltage signal to output, and the second current to voltage conversion circuit converts current passing through the third and fourth transmission lines into a second output voltage signal to output.

The first voltage to current conversion element may include a control terminal and a current path where one end is connected to one end of the first transmission line and a first voltage is applied to the other end, and when the first voltage is applied to the control terminal, the first voltage to current conversion element is turned on to bring the current path into conduction to pass current through one end of the first transmission line from the other end of the current path, the second voltage to current conversion element includes a control terminal and a current path where one end is connected to one end of the second transmission line and the first voltage is applied to the other end, and when the voltage with the second level is applied to the control terminal, the second voltage to current conversion element is turned on to bring the current path into conduction to pass current through one end of the second transmission line from the other end of the current path, the third voltage to current conversion element includes a control terminal and a current path where one end is connected to one end of the third transmission line and the second voltage is applied to the other end, and when the voltage with the third level is applied to the control terminal, the third voltage to current conversion element is turned on to bring the current path into conduction to pass current through the other end of the current path from one end of the third transmission line, and the fourth voltage to current conversion element includes a control terminal and a current path where one end is connected to one end of the fourth transmission line and the second voltage is applied to the other end, and when the voltage with the fourth level is applied to the control terminal, the fourth voltage to current conversion element is turned on to bring the current path into conduction to pass current through the other end of the current path from one end of the fourth transmission line.

The first current to voltage conversion circuit may apply a third voltage lower than the first voltage to the other end of the first transmission line and the other end of the second transmission line, converts the current passing through the first transmission line into a fifth voltage level of the output voltage signal as a binary signal to output, and converts the current passing through the second transmission line into a sixth voltage level of the output voltage signal to output, and the second current to voltage conversion circuit applies a fourth voltage higher than the second voltage to the other end of the third transmission line and the other end of the fourth transmission line, converts the current passing through the third transmission line into a seventh voltage level of the output voltage signal as a binary signal to output, and converts the current passing through the fourth transmission line into an eighth voltage level of the output voltage signal to output.

The first and second voltage to current conversion elements may be formed of first conductive type transistors, and the third and fourth voltage to current conversion elements are formed of second conductive type transistors.

The first and second transmission lines and the third and fourth transmission lines may be arranged to be parallel to each other.

The first and second transmission lines and the third and fourth transmission lines may be arranged to be close to each other.

The first and second transmission lines and the third and fourth transmission lines may be arranged to be close to each other.

The first and second transmission lines and the third and fourth transmission lines may be formed on the same substrate.

The first and second transmission lines and the third and fourth transmission lines may be arranged in wiring layers adjacent to each other in a substrate having the plurality of wiring layers.

The transmission section and the reception section may be formed on a different substrate.

The first and second transmission lines and the third and fourth transmission lines may be formed of a cable that connects both substrates.

The cable may be a parallel line.

The cable may be a coaxial line.

A plurality of first unit data interface circuits, which include the first differential pair voltage to current conversion element and the first current to voltage conversion circuit, and a plurality of second unit data interface circuits, which include the second differential pair voltage to current conversion element and the second current to voltage conversion circuit, may be arranged alternatively.

In order to attain the above object, a data interface circuit of the present invention according to a second aspect of the present invention includes a transmission circuit having first and second voltage to current conversion elements that cause current to flow from a power source according to a first positive phase input signal and a first opposite phase input signal, and third and fourth voltage to current conversion elements that cause current to flow into a ground according to a second positive phase input signal and a second opposite phase input signal; a reception circuit having a first current to voltage conversion circuit that generates an output voltage according to input currents from the first and second voltage to current conversion elements, and a second current to voltage conversion circuit that generates an output voltage according to output currents to the third and fourth current to voltage conversion elements; first and second transmission lines that connect the first and second voltage to current conversion elements to the first current to voltage conversion circuit, and third and fourth transmission lines that connect the third and fourth voltage to current conversion elements to the second current to voltage conversion circuit.

The first and second transmission lines and the third and fourth transmission lines may be arranged to be parallel to each other and to be close to each other.

A predetermined number of the transmission lines is arranged to be close to each other such that parallelism between said transmission lines may be obtained.

In order to attain the above object, a transmission circuit for a data interface circuit of the present invention according to a third aspect of the present invention includes a transmission circuit having a first pair voltage to current conversion element formed of a first voltage to current conversion element and a second voltage to current conversion element, and a second pair voltage to current conversion element formed of a third voltage to current conversion element and a fourth voltage to current conversion element; a first transmission line connected to the first voltage to current conversion element; a second transmission line connected to the second voltage to current conversion element; a third transmission line connected to the third voltage to current conversion element; a fourth transmission line connected to the fourth voltage to current conversion element; and a reception circuit having a first current to voltage conversion circuit connected to the first and second transmission lines, and a second current to voltage conversion circuit connected to the third and fourth transmission lines, wherein the first voltage to current conversion element passes current through the first transmission line toward the first current to voltage conversion circuit when a first input voltage signal as a binary signal reaches a first voltage level, the second voltage to current conversion element passes current through the second transmission line toward the first current to voltage conversion circuit when the first input voltage signal reaches a second voltage level, the third voltage to current conversion element passes current through the third transmission line toward the transmission section from the second current to voltage conversion circuit when a second input voltage signal as a binary signal reaches a third voltage level, and the fourth voltage to current conversion element passes current through the fourth transmission line toward the transmission section from the second current to voltage conversion circuit when the second input voltage signal reaches a fourth voltage level.

In order to attain the above object, a reception circuit for a data interface circuit of the present invention according to a fourth aspect of the present invention includes a transmission circuit having a first pair voltage to current conversion element formed of a first voltage to current conversion element and a second voltage to current conversion element, and a second pair voltage to current conversion element formed of a third voltage to current conversion element and a fourth voltage to current conversion element; a first transmission line connected to the first voltage to current conversion element; a second transmission line connected to the second voltage to current conversion element; a third transmission line connected to the third voltage to current conversion element; a fourth transmission line connected to the fourth voltage to current conversion element; and a reception circuit having a first current to voltage conversion circuit connected to the first and second transmission lines, and a second current to voltage conversion circuit connected to the third and fourth transmission lines, wherein the first current to voltage conversion circuit converts current passing through the first and second transmission lines into a first output voltage signal to output, and the second current to voltage conversion circuit converts current passing through the third and fourth transmission lines into a second output voltage signal to output.

In order to attain the above object, a data transmitting method of the present invention according to a fifth aspect of the present invention includes passing current through first and second transmission lines alternatively in a first direction in accordance with a first positive phase input signal and a first opposite phase input signal; passing current through third and fourth transmission lines alternatively in a second direction being parallel to the first direction and being opposite to the first direction in accordance with a second positive phase input signal and a second opposite phase input signal; generating a first output voltage signal from current passing through the first and second transmission lines to output; and generating a second output voltage signal from current passing through the third and fourth transmission lines to output.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An explanation will be given of a data interface circuit of an embodiment of the present invention with reference to the drawings.

Figure 1:
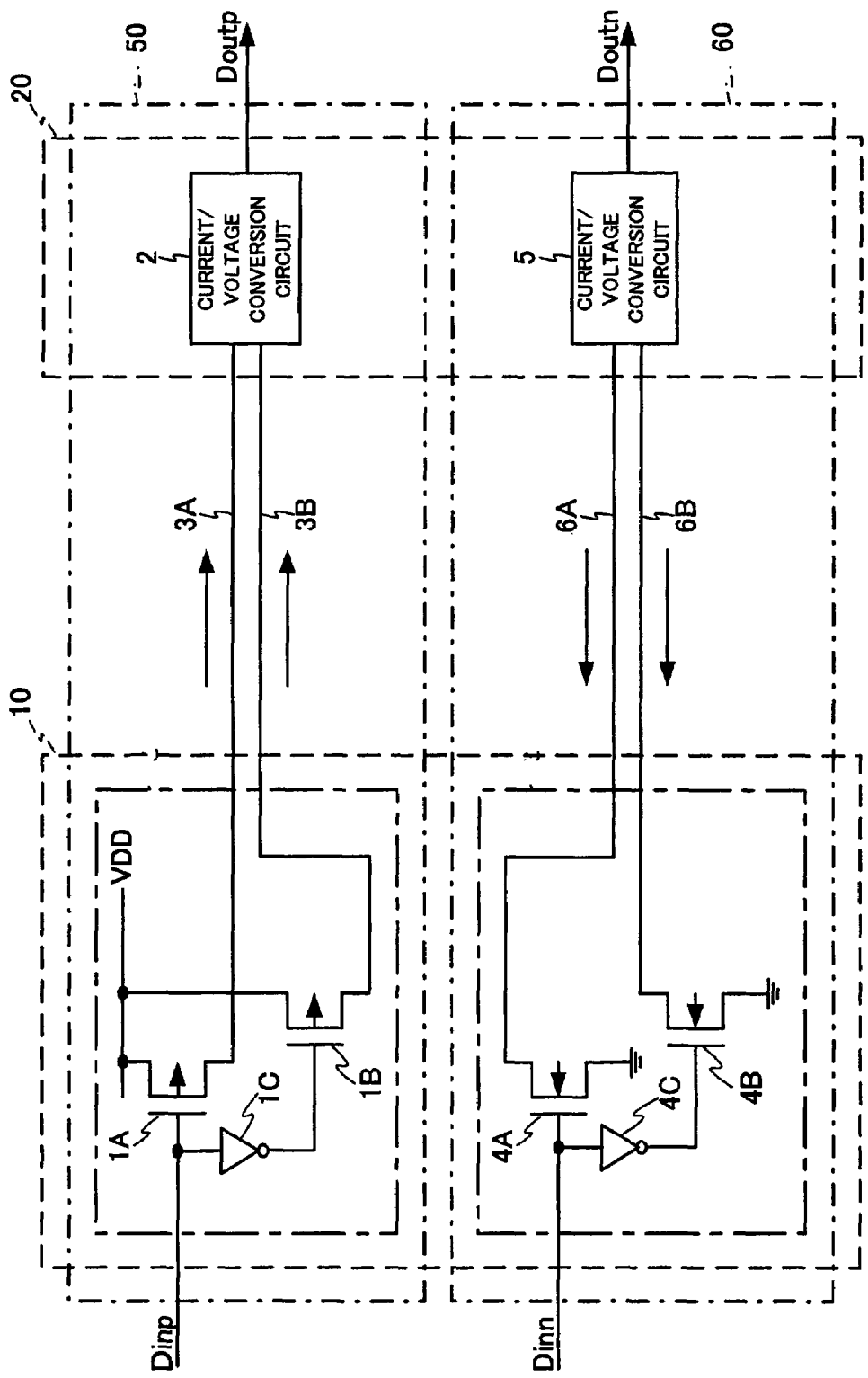
FIG. 1 is a circuit diagram showing a configuration of a data interface circuit according to an embodiment of the present invention.

This data interface circuit includes a transmission section 10 and a reception section 20 as shown in FIG. 1. The transmission section 10 has p-channel MOS transistors 1A, 1B, n-channel MOS transistors 4A, 4B, and inverters 1C, 4C. The reception section 20 has current to voltage conversion circuits 2, 5.

Sources of the p-channel MOS transistors 1A, 1B are connected to a power line to which power voltage VDD is applied. An input voltage signal Dinp is applied to a gate of the p-channel MOS transistor 1A, and an input voltage signal D'inp whose voltage level is inverted by the inverter 1C is applied to the p-channel MOS transistor 1B. Drains of the p-channel MOS transistors 1A and 1B are connected to the current to voltage conversion circuit 2 through transmission lines 3A and 3B formed on a printed board. The p-channel MOS transistors 1A, 1B, inverter 1C, current to voltage conversion circuit 2, and transmission lines 3A, 3B form a unit p-type data interface circuit 50.

Moreover, sources of n-channel MOS transistors 4A and 4B are grounded. An input voltage signal Dinn is applied to a gate of the n-channel MOS transistor 4A, and an input voltage signal D'inn whose voltage level is inverted by the inverter 4C is applied to a gate of the n-channel MOS transistor 4B. Drains of the n-channel MOS transistors 4A and 4B are connected to the current to voltage conversion circuit 5 through transmission lines 6A and 6B formed on a printed board. The n-channel MOS transistors 4A, 4B, inverter 4C, current to voltage conversion circuit 5, and transmission lines 6A, 6B form a unit n-type data interface circuit 60.

The transmission lines 3A, 3B and transmission lines 6A, 6B are formed on the printed board to be substantially parallel to each other and close to each other with high density.

The p-channel MOS transistors 1A and 1B form a differential pair transistor. When voltage signals, which include a positive phase signal (Dinp) and an opposite phase signal (D'inp) each generated from a single signal Dinp, are input, the p-channel MOS transistors 1A and 1B are turned on alternatively. In other words, when the positive phase voltage signal Dinp reaches a low level, the p-channel MOS transistor 1A is turned on, and when it reaches a high level, the p-channel MOS transistor 1A is turned off. While, when the opposite phase voltage signal D'in1 reaches a low level, the p-channel MOS transistor 1B is turned on, and when it reaches a high level, the p-channel MOS transistor 1B is turned off.

The current to voltage conversion circuit 2 converts current, which flows into the transmission lines 3A and 3B, into voltage and outputs the converted voltage as an output voltage signal Doutp. For example, the current to voltage conversion circuit 2 converts current, which flows into the transmission line 3A, into a low-level output voltage signal Doutp and current, which flows into the transmission line 3B, to a high-level output voltage signal Doutp.

The n-channel MOS transistors 4A and 4B form a differential pair transistor. When voltage signals, which include a positive phase signal (Dinn) and an opposite phase signal (D'inn) each generated from a single signal Dinn, are input, the n-channel MOS transistors 4A and 4B are turned on alternatively. In other words, when the positive phase voltage signal Dinn reaches a high level, the n-channel MOS transistor 4A is turned on, and when it reaches a low level, the n-channel MOS transistor 4A is turned off. While, when the opposite phase voltage signal D'inn reaches a high level, the n-channel MOS transistor 4B is turned on, and when it reaches a low level, the n-channel MOS transistor 4B is turned off.

The current to voltage conversion circuit 5 converts current, which flows into the transmission lines 6A and 6B, into a voltage and outputs the converted voltage as an output voltage signal Doutn. For example, the current to voltage conversion circuit 5 converts current, which flows into the transmission line 6A, into a high-level output voltage signal Doutn to output and current, which flows into the transmission line 6B, to a low-level output voltage signal Doutn to output.

An explanation will be next given of a transmission operation in which the data interface circuit shown in FIG. 1 transmits two data signals by a differential transmission method.

When the input voltage signal Dinp of the unit p-type data interface circuit 50 reaches a low level, a low-level voltage is applied to the gate of the p-channel MOS transistor 1A and a high-level voltage is applied to the gate of the p-channel MOS transistor 1B. For this reason, the p-channel MOS transistor 1A is turned on, and the p-channel MOS transistor 1B is turned off. Accordingly, a current (current signal) flows into the current to voltage conversion circuit 2 through a source-drain path (current path) of the p-channel MOS transistor 1A and transmission line 3A from the power line to which voltage VDD is applied. The current to voltage conversion circuit 2 converts this current signal into, for example, a low-level output voltage signal Doutn and outputs the converted signal.

While, when the input voltage signal Dinp of the unit p-type data interface circuit 50 reaches a high level, a high-level voltage signal is applied to the gate of the p-channel MOS transistor 1A and a low-level voltage signal is applied to the gate of the p-channel MOS transistor 1B. Accordingly, the p-channel MOS transistor 1A is turned off, and the p-channel MOS transistor 1B is turned on. For this reason, a current (current signal) flows into the current to voltage conversion circuit 2 through a source-drain path (current path) of the p-channel MOS transistor 1B and transmission line 3B from the power line. The current to voltage conversion circuit 2 converts this current signal into, for example, a high-level output voltage signal Doutp and outputs the converted signal.

Moreover, when the input voltage signal Dinn of the unit n-type data interface circuit 60 reaches a high level, a high-level voltage signal is applied to the gate of the n-channel MOS transistor 4A and a low-level voltage is applied to the gate of the n-channel MOS transistor 4B. Accordingly, the n-channel MOS transistor 4A is turned on, and the n-channel MOS transistor 4B is turned off. The transmission line 6A is grounded through a drain-source path (current path) of the turned-on n-channel MOS transistor 4A, and a current (current signal) flows into the ground through the transmission line 6A and the n-channel MOS transistor 4A from the current to voltage conversion circuit 5. The current to voltage conversion circuit 5 converts this current signal into, for example, a high-level output voltage signal Doutn and outputs the converted signal.

While, when the input voltage signal Dinn reaches a low level, a low-level voltage is applied to the gate of the n-channel MOS transistor 4A and a high-level voltage is applied to the gate of the n-channel MOS transistor 4B. Accordingly, the n-channel MOS transistor 4A is turned off, and the n-channel MOS transistor 4B is turned on. The transmission line 6B is grounded through a drain-source path (current path) of the turned-on n-channel MOS transistor 4B, and a current (current signal) flows into the ground through the transmission line 6B and the n-channel MOS transistor 4B from the current to voltage conversion circuit 2. The current to voltage conversion circuit 5 converts this current signal into, for example, a low-level output voltage signal Doutp and outputs the converted signal.

In this way, the data interface circuit shown in FIG. 1 can transmit two data signals Dinp and Dinn by the differential transmission method.

Moreover, current, which flows into the transmission lines 3A and 3B, and current, which flows into transmission lines 6A and 6B, are supplied in synchronization with the opposite direction. Accordingly, when two data signals Dinp and Dinn are signals that are synchronized with the clock, EMI generated from the transmission lines 3A and 3B and EMI generated from the transmission lines 6A and 6B are cancelled each other. This makes it possible to suppress EMI generated in the data interface circuit.

Figure 2A:
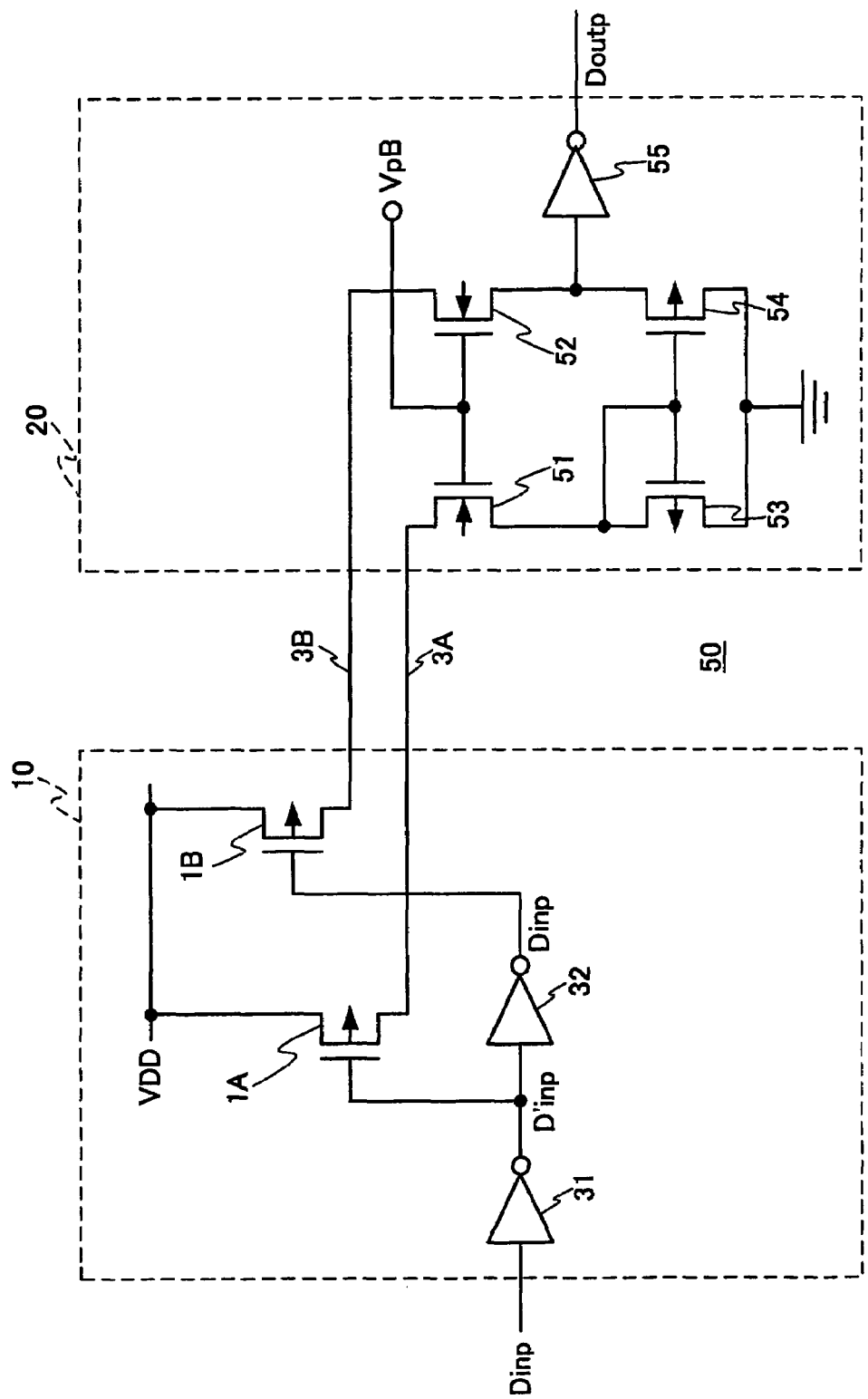
FIGS. 2A and 2B are circuit diagrams each showing a basic configuration of a data interface circuit according to an embodiment of the present invention.
Figure 2B:
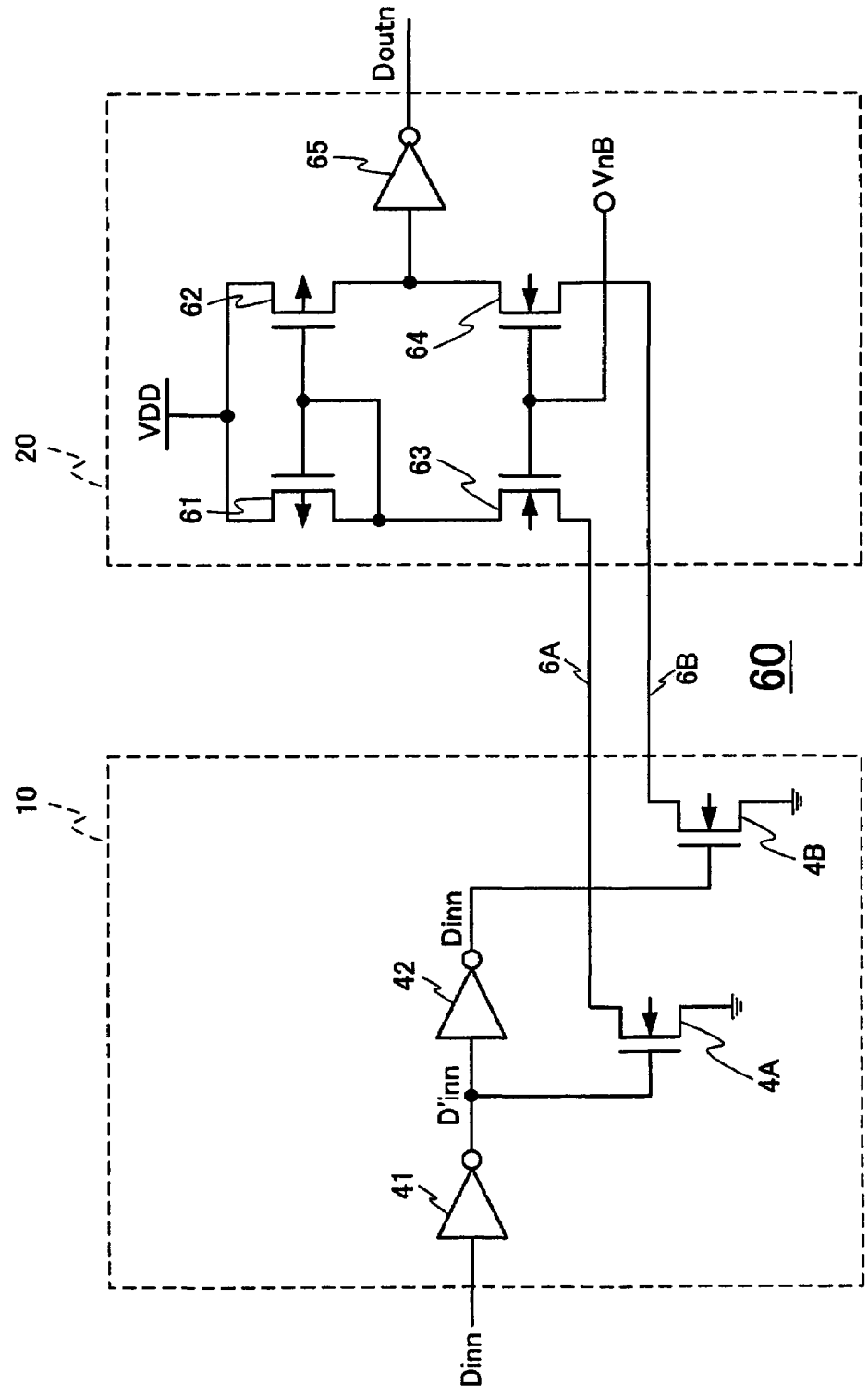

FIG. 2A shows a specific configuration example of the unit p-type data interface circuit 50, and FIG. 2B shows a specific configuration example of the unit n-type data interface circuit 60.

As shown in FIG. 2A, the transmission section 10 of the unit p-type data interface circuit 50 includes inverters 31, 32 and open-drain type p-channel MOS transistors 1A, 1B. The inverter 31 inverts the binary input voltage signal Dinp and outputs it as D'inp and the inverter 32 inverts an output voltage signal of the inverter 31 and outputs it as Doutp. The gate of the p-channel MOS transistor 1A is connected to an output terminal of the inverter 31, the source thereof is connected to the power line to which power voltage VDD is applied, and the drain thereof is connected to the transmission line 3A. When being turned on, the p-channel MOS transistor 1A passes current through the transmission line 3A from the power line. While, the gate of p-channel MOS transistor 1B is connected to an output terminal of the inverter 32, power voltage VDD is applied to the source thereof, and the drain thereof is connected to the transmission line 3B. When being turned on, the p-channel MOS transistor 1B passes current through the transmission line 3B from the power line.

The reception section 20 of the unit p-type data interface circuit 50 includes n-channel MOS transistors 51, 52, p-channel MOS transistor 53, 54, and an inverter 55. Drains of p-channel MOS transistor 53 and 54 are connected to each other to be grounded, and the gates thereof are connected to each other, and further connected to a source of the p channel MOS transistor 53. A gate and a source of the p-channel MOS transistor 53 are connected to the source of the n-channel MOS transistor 51. A source of the n-channel MOS transistor 52 is connected to an input terminal of the inverter 55 and a source of the p-channel MOS transistor 54. The gates of the n-channel MOS transistors 51 and 52 are connected to each other, and a bias voltage VpB is applied thereto. A drain of the n-channel MOS transistor 51 is connected to the transmission line 3A, and a drain of the n-channel MOS transistor 52 is connected to the transmission line 3B.

As shown in FIG. 2B, the transmission section 10 of the unit n-type data interface circuit 60 includes inverters 41, 42 and open-drain type n-channel MOS transistors 4A, 4B. The inverter 41 inverts the binary input voltage signal Dinn and outputs it as D'inn, and the inverter 42 inverts an output signal of the inverter 41 and outputs it as Doutn. A gate of the n-channel MOS transistor 4A is connected to an output terminal of the inverter 41, the source thereof is grounded, and the drain thereof is connected to the transmission line 6A. When being turned on, the n-channel MOS transistor 4A passes current, which is to be supplied via the transmission line 6A from the reception section 20, through a ground terminal. While, the gate of the n-channel MOS transistor 4B is connected to an output terminal of the inverter 42, the source thereof is grounded, and the drain thereof is connected to the transmission line 6B. When being turned on, the n-channel MOS transistor 4B passes current, which is supplied via the transmission line 6B from the reception section 20, through the ground terminal.

The reception section 20 of the unit n-type data interface circuit 60 includes p-channel MOS transistors 61, 62, n-channel MOS transistor 63, 64, and an inverter 65. Sources of n-channel MOS transistor 63 and 64 are connected to each other, and power voltage VDD is applied thereto. The gates thereof are connected to each other, and further connected to a source of the p-channel MOS transistor 61. A drain of the n-channel MOS transistor 63 is connected to the drain of the p-channel MOS transistor 61. A drain of the n-channel MOS transistor 64 is connected to an input terminal of the inverter 65 and a drain of the p-channel MOS transistor 62. The gates of the n-channel MOS transistors 63 and 64 are connected to each other, and a bias voltage VnB with a fixed value is applied thereto. A source of the n-channel MOS transistor 63 is connected to the transmission line 6A, and a drain of the n-channel MOS transistor 64 is connected to the transmission line 6B.

In addition, the circuits shown in FIGS. 2A and 2B are no more than one example, and any change may be possible. For example, any reference voltage, set voltage, fixed voltage may be used in place of the power voltage VDD. Moreover, any reference voltage may be used in place of the ground.

To sum up, any configuration of the transmission section 10 and current to voltage conversion circuit 5 may be adopted if the following conditions are satisfied.

More specifically, when the first input voltage signal Dinp reaches a high level, current is passed through the first transmission line (3A or 3B) in a first direction (right or left direction in the figure), and when the first input voltage signal Dinn reaches a low level, current is passed through the second transmission line (3B or 3A) in the first direction;

When the second input voltage signal Dinn reaches a high level, current is passed through the third transmission line (6A or 6B) in a second direction (left or right direction in the figure), and when the second input voltage signal Dinn reaches a low level, current is passed through the fourth transmission line (6B or 6A) in the second direction; and Each current is converted into its corresponding voltage signal to be output.

The aforementioned configuration makes it possible to cancel EMI generated by the current, which flows into the first or second path, and the current, which flows into the third or fourth transmission line, so that the total EMI can be suppressed.

Moreover, the present invention is not limited to the aforementioned embodiment, and various modifications and applications may be possible.

Figure 3:
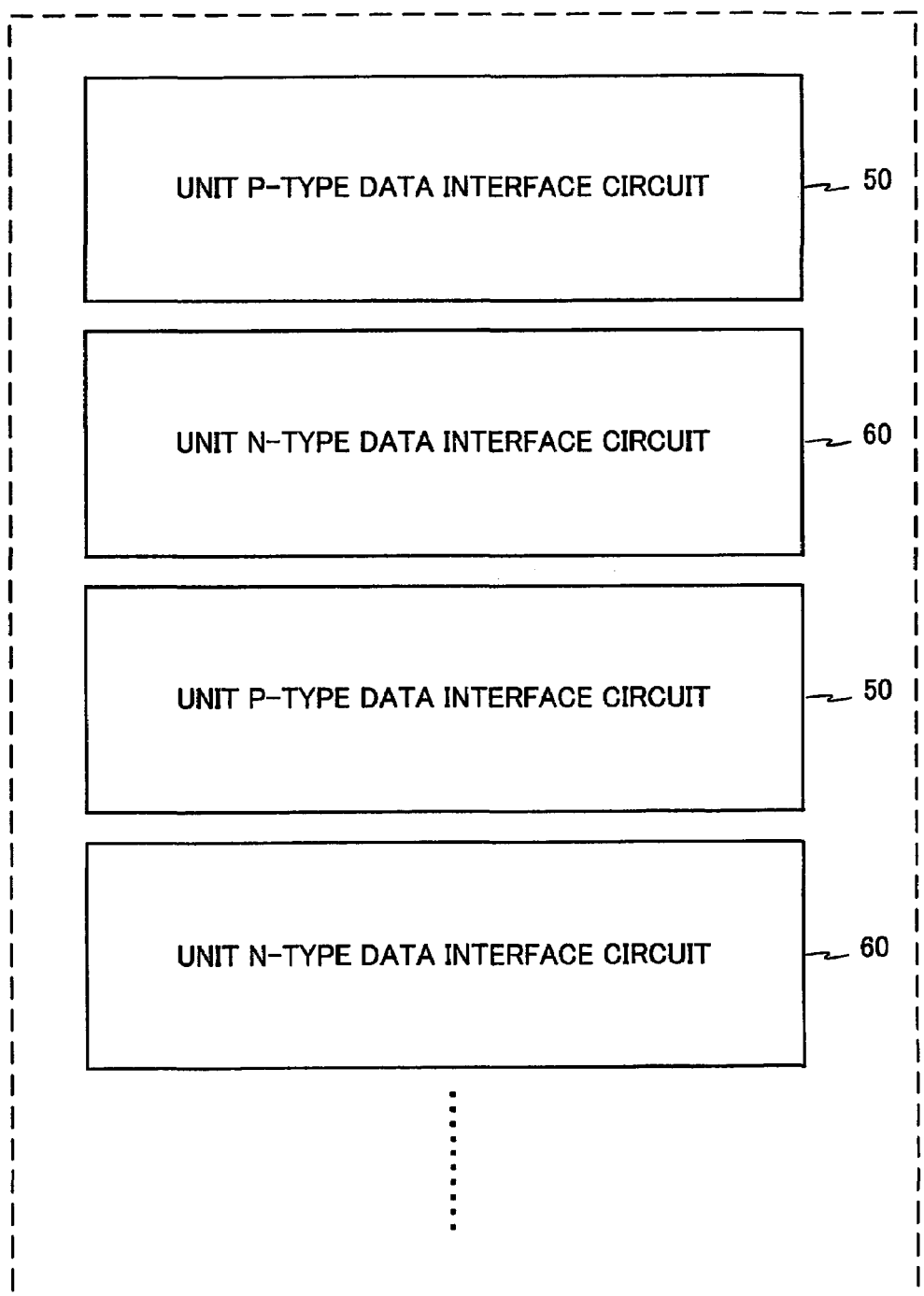
FIG. 3 is a view showing a configuration of a modification example of the data interface circuit shown in FIG. 1.

For example, through the aforementioned embodiment relates to the data interface circuit that transmits two signals, a plurality of unit p-type data interface circuits 50 and a plurality of unit n-type data interface circuits 60 are arranged on a printed circuit board to make it possible to transmit more signals as shown in FIG. 3. Furthermore, the unit p-type data interface circuit 50 and the unit n-type data interface circuit 60 are alternatively arranged to cancel adjacent EMI, so that EMI generated in the data interface circuit can be suppressed.

Additionally, in order to improve an EMI suppression effect, it is desirable that the transmission line of the unit p-type data interface circuit 50 and that of the unit n-type data interface circuit 60 be formed to be parallel to each other as possible. It is also desirable that they be formed to be close to each other as possible.

Moreover, the number of unit p-type data interface circuits 50 and the number of unit n-type data interface circuits 60 do not have to be the same, but it is desirable that the difference in the number therebetween be small (one is preferable).

Figure 4:
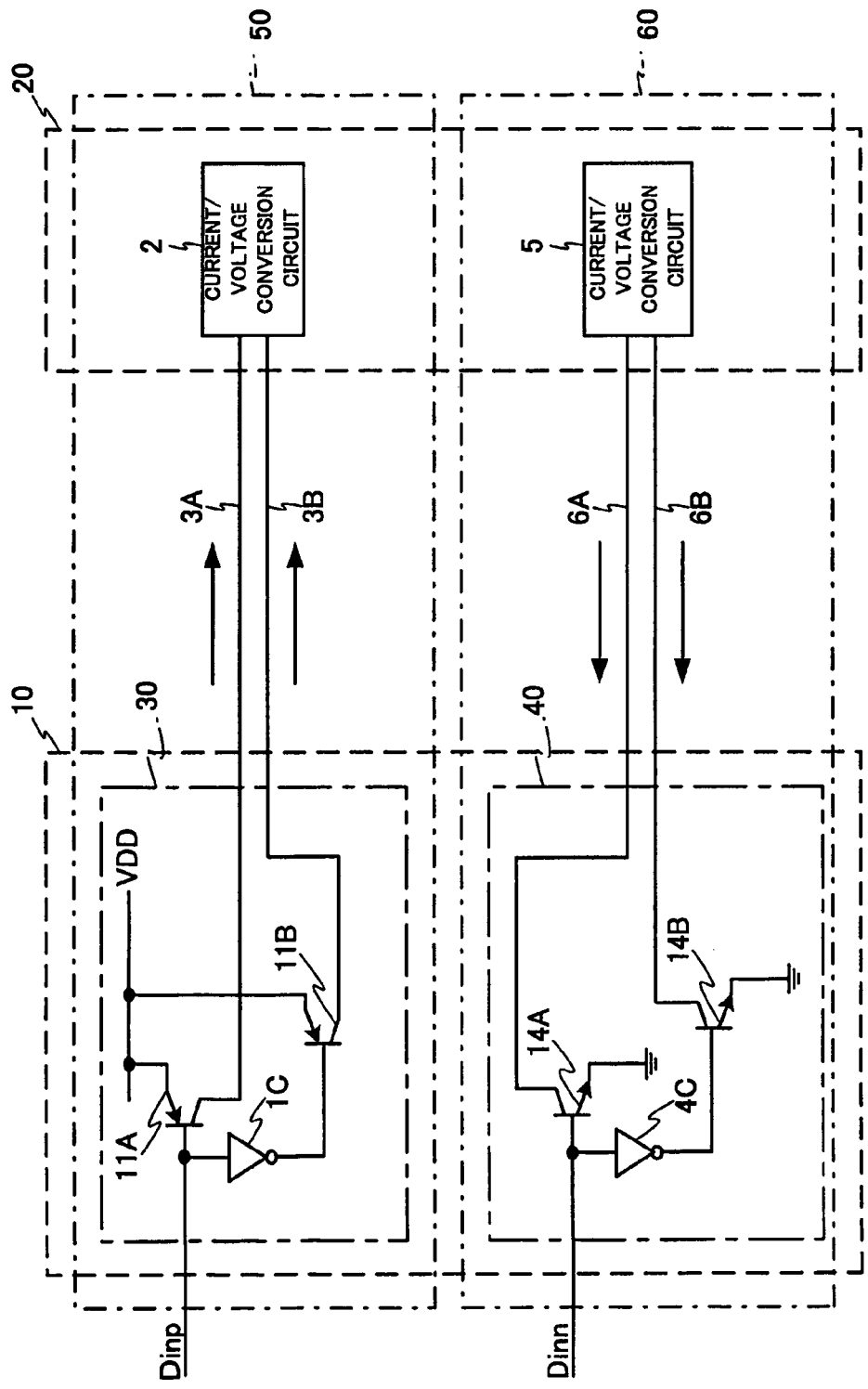
FIG. 4 is a circuit diagram showing a configuration of a data interface circuit in which a plurality of unit p-type data interface circuits and unit n-type data interface circuits are alternatively arrayed.

The device for converting the voltage signal into the input current signal and the device for converting the current signal into the output voltage signal are not limited to the MOS transistors (1A, 1B, 4A, 4B), and any switching element that is capable of operating at high speed can be used. As one example, FIG. 4 shows a circuit example in which switching elements (MOSFETs) 1A, 1B, 4A, 4B of the circuit shown in FIG. 1 are replaced with bipolar transistors 11A, 11B, 14A, 14B.

Figure 5:
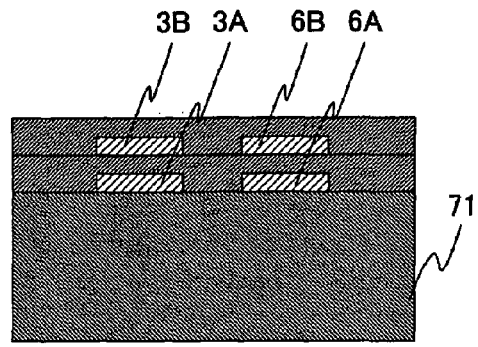
FIGS. 5 and 6 are views each showing a configuration example when transmission lines are formed on a multilayer wiring board.
Figure 6:
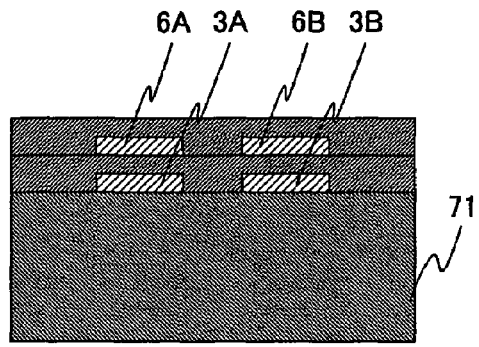

The transmission line of the unit p-type data interface circuit 50 and that of the unit n-type data interface circuit 60 do not have to be formed on the same substrate. For example, as shown in FIGS. 5 and 6, in a substrate 71 having a plurality of wiring layers, these transmission lines may be provided on the adjacent wring layers.

Figure 7:
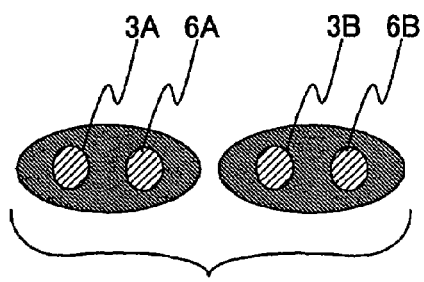
FIGS. 7 and 8 are views each showing a configuration example when transmission lines are formed using a flat cable.
Figure 8:
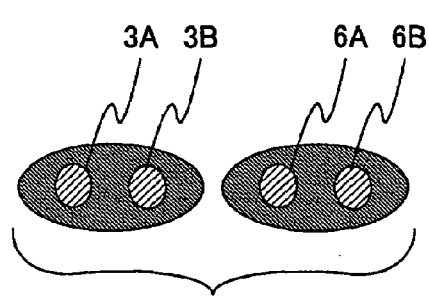
Figure 9:
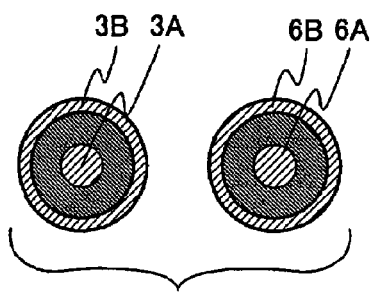
FIGS. 9 and 10 are views each showing a configuration example when transmission lines are formed using a coaxial cable.
Figure 10:
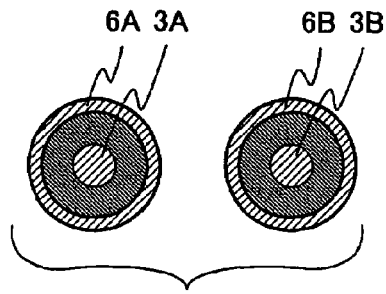
Figure 11:
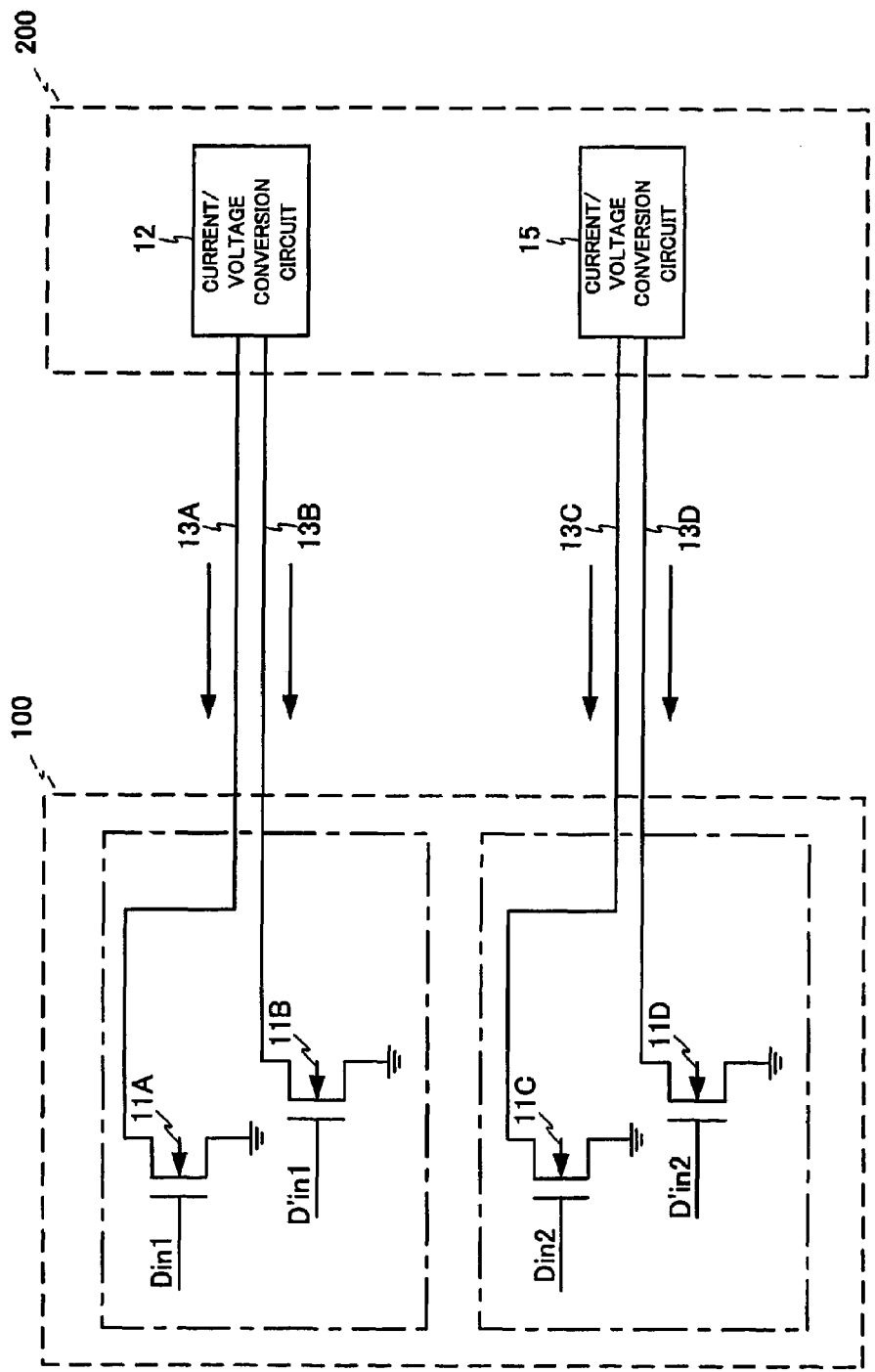
FIG. 11 is a circuit diagram showing a configuration example of a conventional data interface circuit.

The transmission section 10 and reception section 20 do not have to be formed on the same substrate, and they may be formed on a different substrate. In this case, the transmission line that connects both substrates may be a cable. This cable may be a parallel line as illustrated in FIGS. 7 and 8 or a coaxial line as illustrated in FIGS. 9 and 10. This parallel line may be formed of a twisted pair line, a flat cable, a flexible cable, etc.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-009281 filed on Jan. 17, 2002 and including specification, claims, drawings and summary. The disclosure of the above Japanese Patent Application is incorporated herein by reference in its entirety.

What is claimed is:

1. A data interface circuit comprising:
   a transmission section having a first pair voltage to current conversion element formed of a first voltage to current conversion element and a second voltage to current conversion element, and a second pair voltage to current conversion element formed of a third voltage to current conversion element and a fourth voltage to current conversion element;
   a first transmission line connected to said first voltage to current conversion element;
   a second transmission line connected to said second voltage to current conversion element;
   a third transmission line connected to said third voltage to current conversion element;
   a fourth transmission line connected to said fourth voltage to current conversion element; and
   a reception section having a first current to voltage conversion circuit connected to said first and second transmission lines, and a second current to voltage conversion circuit connected to said third and fourth transmission lines, wherein
   said first voltage to current conversion element passes current through said first transmission line toward said first current to voltage conversion circuit when a first input voltage signal as a binary signal reaches a first voltage level,
   said second voltage to current conversion element passes current through said second transmission line toward said first current to voltage conversion circuit when said first input voltage signal reaches a second voltage level,
   said third voltage to current conversion element passes current through said third transmission line toward said transmission section from said second current to voltage conversion circuit when a second input voltage signal as a binary signal reaches a third voltage level, and
   said fourth voltage to current conversion element passes current through said fourth transmission line toward said transmission section from said second current to voltage conversion circuit when said second input voltage signal reaches a fourth voltage level,
   said first current to voltage conversion circuit converts current passing through said first and second transmission lines into only a single first output voltage signal to output, and
   said second current to voltage conversion circuit converts current passing through said third and fourth transmission lines into only a single second output voltage signal to output.

2. The data interface circuit according to claim 1, wherein said first voltage to current conversion element includes a control terminal and a current path where one end is connected to one end of said first transmission line and a first voltage is applied to the other end, and when the first voltage is applied to the control terminal, said first voltage to current conversion element is turned on to bring the current path into conduction to pass current through one end of said first transmission line from the other end of the current path,
   said second voltage to current conversion element includes a control terminal and a current path where one end is connected to one end of said second transmission line and the first voltage is applied to the other end, and when the voltage with the second level is applied to the control terminal, said second voltage to current conversion element is turned on to bring the current path into conduction to pass current through one end of said second transmission line from the other end of the current path,
   said third voltage to current conversion element includes a control terminal and a current path where one end is connected to one end of said third transmission line and the second voltage is applied to the other end, and when the voltage with the third level is applied to the control terminal, said third voltage to current conversion element is turned on to bring the current path into conduction to pass current through the other end of said current path from one end of said third transmission line, and
   said fourth voltage to current conversion element includes a control terminal and a current path where one end is connected to one end of said fourth transmission line and the second voltage is applied to the other end, and when the voltage with the fourth level is applied to the control terminal, said fourth voltage to current conversion element is turned on to bring the current path into conduction to pass current through the other end of said current path from one end of said fourth transmission line.

3. The data interface circuit according to claim 2, wherein said first current to voltage conversion circuit applies a third voltage lower than the first voltage to the other end of said first transmission line and the other end of said second transmission line, converts the current passing through said first transmission line into a fifth voltage level of the output voltage signal as a binary signal to output, and converts the current passing through said second transmission line into a sixth voltage level of the output voltage signal to output, and said second current to voltage conversion circuit applies a fourth voltage higher than the second voltage to the other end of said third transmission line and the other end of said fourth transmission line, converts the current passing through said third transmission line into a seventh voltage level of the output voltage signal as a binary signal to output, and converts the current passing through said fourth transmission line into an eighth voltage level of the output voltage signal to output.

4. The data interface circuit according to claim 1, wherein said first and second voltage to current conversion elements are formed of first conductive type transistors, and said third and fourth voltage to current conversion elements are formed of second conductive type transistors.

5. The data interface circuit according to claim 1, wherein said first and second transmission lines and said third and fourth transmission lines are arranged to be parallel to each other.

6. The data interface circuit according to claim 5, wherein said first and second transmission lines and said third and fourth transmission lines are arranged to be close to each other.

7. The data interface circuit according to claim 1, wherein said first and second transmission lines and said third and fourth transmission lines are arranged to be close to each other.

8. The data interface circuit according to claim 1, wherein said first and second transmission lines and said third and fourth transmission lines are formed on the same substrate.

9. The data interface circuit according to claim 8, wherein said first and second transmission lines and said third and fourth transmission lines are arranged in wiring layers adjacent to each other in a substrate having the plurality of wiring layers.

10. The data interface circuit according to claim 1, wherein said transmission section and said reception section are formed on a different substrate.

11. The data interface circuit according to claim 10, wherein said first and second transmission lines and said third and fourth transmission lines are formed of a cable that connects both substrates.

12. The data interface circuit according to claim 11, wherein said cable is a parallel line.

13. The data interface circuit according to claim 11, wherein said cable is a coaxial line.

14. The data interface circuit according to claim 1, wherein a plurality of first unit data interface circuits, which include said first pair voltage to current conversion element and said first current to voltage conversion circuit, and a plurality of second unit data interface circuits, which include said second pair voltage to current conversion element and said second current to voltage conversion circuit, are arranged alternatively.

15. A data interface circuit comprising:

a transmission section having a first pair voltage to current conversion element formed of a first voltage to current conversion element and a second voltage to current conversion element, and a second pair voltage to current conversion element formed of a third voltage to current conversion element and a fourth voltage to current conversion element;

a first transmission line connected to said first voltage to current conversion element;

a second transmission line connected to said second voltage to current conversion element;

a third transmission line connected to said third voltage to current conversion element;

a fourth transmission line connected to said fourth voltage to current conversion element; and a reception section having a first current to voltage conversion circuit connected to said first and second transmission lines, and a second current to voltage conversion circuit connected to said third and fourth transmission lines, wherein said first voltage to current conversion element passes current through said first transmission line toward said first current to voltage conversion circuit when a first input voltage signal as a binary signal reaches a first voltage level, said second voltage to current conversion element passes current through said second transmission line toward said first current to voltage conversion circuit when said first input voltage signal reaches a second voltage level, said third voltage to current conversion element passes current through said third transmission line toward said transmission section from said second current to voltage conversion circuit when a second input voltage signal as a binary signal reaches a third voltage level, and said fourth voltage to current conversion element passes current through said fourth transmission line toward said transmission section from said second current to voltage conversion circuit when said second input voltage signal reaches a fourth voltage level, said first current to voltage conversion circuit converts current passing through said first and second transmission lines into a first output voltage signal to output, and said second current to voltage conversion circuit converts current passing through said third and fourth transmission lines into a second output voltage signal to output, wherein the second current to voltage conversion circuit contains a plurality of transistors and a gate of each transistor of the plurality of transistors is connected to a gate of at least one other transistor of the plurality of transistors.

16. The data interface circuit according to claim 15, wherein said first voltage to current conversion element includes a control terminal and a current path where one end is connected to one end of said first transmission line and a first voltage is applied to the other end, and when the first voltage is applied to the control terminal, said first voltage to current conversion element is turned on to bring the current path into conduction to pass current through one end of said first transmission line from the other end of the current path, said second voltage to current conversion element includes a control terminal and a current path where one end is connected to one end of said second transmission line and the first voltage is applied to the other end, and when the voltage with the second level is applied to the control terminal, said second voltage to current conversion element is turned on to bring the current path into conduction to pass current through one end of said second transmission line from the other end of the current path, said third voltage to current conversion element includes a control terminal and a current path where one end is connected to one end of said third transmission line and the second voltage is applied to the other end, and when the voltage with the third level is applied to the control terminal, said third voltage to current conversion element is turned on to bring the current path into conduction to pass current through the other end of said current path from one end of said third transmission line, and said fourth voltage to current conversion element includes a control terminal and a current path where one end is connected to one end of said fourth transmission line and the second voltage is applied to the other end, and when the voltage with the fourth level is applied to the control terminal, said fourth voltage to current conversion element is turned on to bring the current path into conduction to pass current through the other end of said current path from one end of said fourth transmission line.

17. The data interface circuit according to claim 16, wherein said first current to voltage conversion circuit applies a third voltage lower than the first voltage to the other end of said first transmission line and the other end of said second transmission line, converts the current passing through said first transmission line into a fifth voltage level of the output voltage signal as a binary signal to output, and converts the current passing through said second transmission line into a sixth voltage level of the output voltage signal to output, and said second current to voltage conversion circuit applies a fourth voltage higher than the second voltage to the other end of said third transmission line and the other end of said fourth transmission line, converts the current passing through said third transmission line into a seventh voltage level of the output voltage signal as a binary signal to output, and converts the current passing through said fourth transmission line into an eighth voltage level of the output voltage signal to output.

18. The data interface circuit according to claim 15, wherein said first and second voltage to current conversion elements are formed of first conductive type transistors, and said third and fourth voltage to current conversion elements are formed of second conductive type transistors.

19. The data interface circuit according to claim 15, wherein said first and second transmission lines and said third and fourth transmission lines are arranged to be parallel to each other.

20. The data interface circuit according to claim 19, wherein said first and second transmission lines and said third and fourth transmission lines are arranged to be close to each other.

21. The data interface circuit according to claim 15, wherein said first and second transmission lines and said third and fourth transmission lines are arranged to be close to each other.

22. The data interface circuit according to claim 15, wherein said first and second transmission lines and said third and fourth transmission lines are formed on the same substrate.

23. The data interface circuit according to claim 22, wherein said first and second transmission lines and said third and fourth transmission lines are arranged in wiring layers adjacent to each other in a substrate having the plurality of wiring layers.

24. The data interface circuit according to claim 15, wherein said transmission section and said reception section are formed on a different substrate.

25. The data interface circuit according to claim 24, wherein said first and second transmission lines and said third and fourth transmission lines are formed of a cable that connects both substrates.

26. The data interface circuit according to claim 25, wherein said cable is a parallel line.

27. The data interface circuit according to claim 25, wherein said cable is a coaxial line.

28. The data interface circuit according to claim 15, wherein a plurality of first unit data interface circuits, which include said first pair voltage to current conversion element and said first current to voltage conversion circuit, and a plurality of second unit data interface circuits, which include said second pair voltage to current conversion element and said second current to voltage conversion circuit, are arranged alternatively.

* * * * *